(12) United States Patent
Prucey

(10) Patent No.: US 8,419,517 B2
(45) Date of Patent: Apr. 16, 2013

(54) METHOD OF PLAYING A GAME AND COMPUTERIZED SYSTEM FOR PLAYING THE GAME

(76) Inventor: James Prucey, New York, NY (US)

( * ) Notice: Subject to any disclaimer, the term of this patent is extended or adjusted under 35 U.S.C. 154(b) by 156 days.

(21) Appl. No.: 12/945,300

(22) Filed: Nov. 12, 2010

(65) Prior Publication Data

US 2011/0111834 A1    May 12, 2011

Related U.S. Application Data

(60) Provisional application No. 61/281,077, filed on Nov. 12, 2009.

(51) Int. Cl.
*A63F 13/00*        (2006.01)

(52) U.S. Cl.
USPC ........ 463/10; 463/9; 463/11; 463/12; 463/13; 463/16; 463/20

(58) Field of Classification Search ................. 463/9–13, 463/16, 20
See application file for complete search history.

(56) References Cited

U.S. PATENT DOCUMENTS

| | | | | |
|---|---|---|---|---|
| 4,359,227 A | * | 11/1982 | Porciello | 273/268 |
| 4,448,420 A | | 5/1984 | Escamilla-Kelly | |
| 4,720,108 A | * | 1/1988 | Gramera | 273/146 |
| 4,743,025 A | * | 5/1988 | Gramera | 273/146 |
| 5,301,952 A | * | 4/1994 | Fitzgerald | 273/269 |
| 5,524,898 A | * | 6/1996 | Pavlovic | 273/292 |
| 6,702,671 B2 | | 3/2004 | Tarantino | |
| 7,090,579 B2 | | 8/2006 | Tarantino | |
| 7,291,067 B2 | | 11/2007 | Tarantino | |

OTHER PUBLICATIONS

Alchemy—Part 1[online]. Youtube, Nov. 16, 2008 [retrieved on Jul. 10, 2012]. Retrieved from the Internet <URL: http://www.youtube.com/watch?v=rGAoUS2salM>.*

* cited by examiner

*Primary Examiner* — Dmitry Suhol
*Assistant Examiner* — David Duffy
(74) *Attorney, Agent, or Firm* — Howard & Howard Attorneys PLLC

(57) ABSTRACT

A computer based game is played in a plurality of rounds on a matrix having a plurality of cells typically forming a rectangular matrix. A plurality of tokens is generated with each token defining a first indicator and a second indicator. The user places at least one of the tokens into one of the unoccupied cells of the matrix. When the user requests a new round, each token on the matrix is temporarily locked to its cell. An award is awarding based on the positional relationship between the indicators of the tokens with respect to one another when the user requests a new round. The tokens may be removed from the matrix based on the positional relationship between the indicators of the tokens with respect to one another.

14 Claims, 7 Drawing Sheets

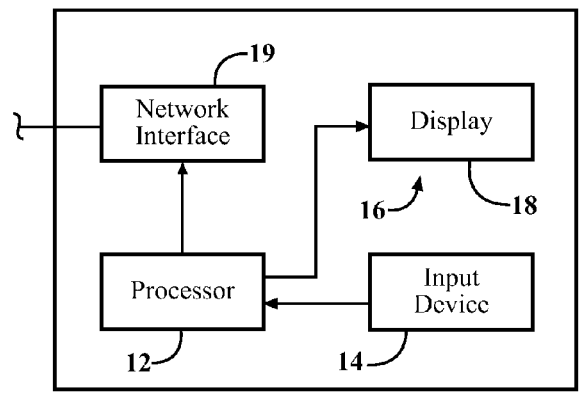
FIG. 1
FIG. 2
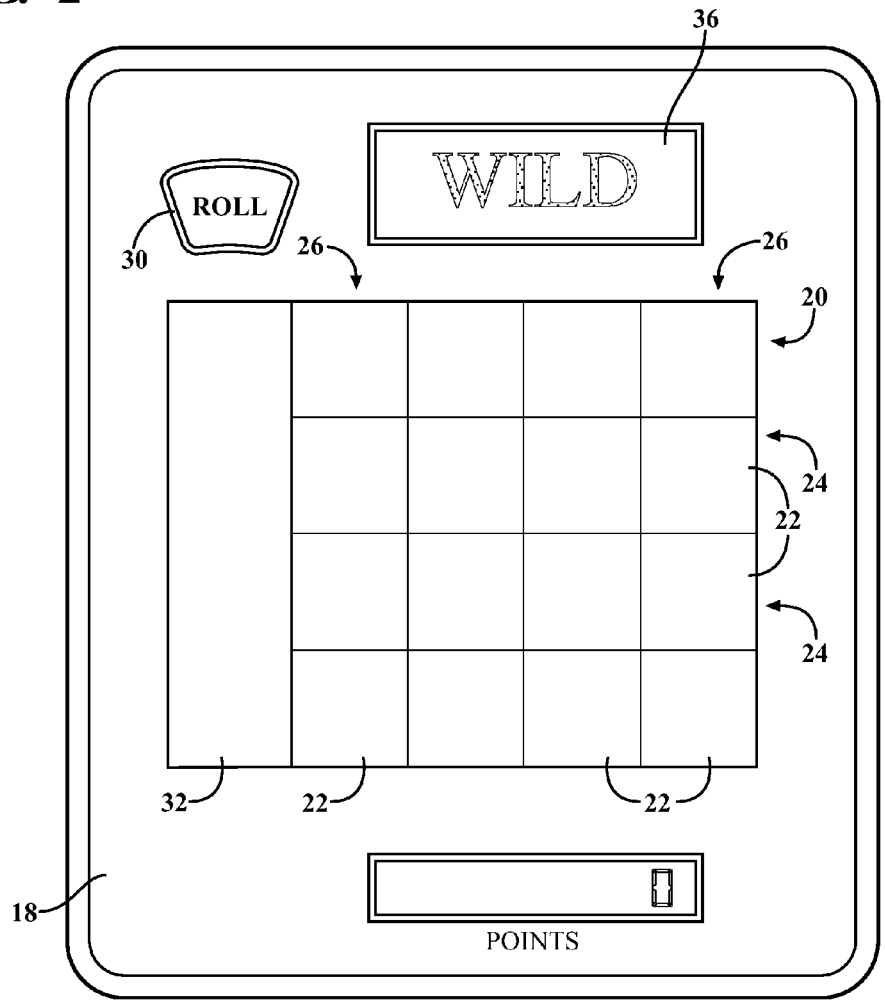

| Description | Visual Representation with Four Tokens | Points | Clear Tokens from Matrix? |
|---|---|---|---|
| The Tokens Display Only One of the First Indicators and Only One of the Second Indicators. |  | 400 | Yes |
| The Tokens Display each of the First Indicators and Only One of the Second Indicators. |  | 200 | Yes |
| The Tokens Display Only One of the First Indicators and Each of the Second Indicators. |  | 200 | Yes |
| The Tokens Display Each of the First Indicators and Each of the Second Indicators. |  | 100 | No |
| Half of the Tokens Display One of the First Indicators and One of the Second Indicators and the Other Half of Two Tokens Display Another of the First Indicators and Another of the Second Indicators. |  | 60 | No |
| The Tokens Display Only One of the Second Indicators; |  | 40 | No |

FIG. 6A

| Description | Visual Representation with Four Tokens | Points | Clear Tokens from Matrix? |
|---|---|---|---|
| The Tokens Display Only One of the First Indicators; | | 40 | No |
| Half of the Tokens Display One of the First Indicators and One of the Second Indicators and Another Half of the Tokens Display Another of the First Indicators and Another of the First Indicators; | | 20 | No |
| The Tokens Display Each of the Second Indicators and Half of the Tokens Display one of the First Indicators; | | 10 | No |
| The Tokens Display Each of the First Indicators. | | 10 | No |
| Half of the Tokens Display One of the Second Indicators and the Other Half of the Token Display Another of the Second Indicators; | | 5 | No |
| Half of the Tokens Display One of the First Indicators and the Other Half of the Tokens Display Another of the First Indicators. | | 5 | No |

FIG. 6B

METHOD OF PLAYING A GAME AND COMPUTERIZED SYSTEM FOR PLAYING THE GAME

CROSS REFERENCE TO RELATED APPLICATION

This application claims the benefit of provisional patent application No. 61/281,077, filed Nov. 12, 2009, which is hereby incorporated by reference.

BACKGROUND OF THE INVENTION

1. Field of the Invention

The subject invention relates to a game of amusement played on a computerized system.

2. Description of the Related Art

Computerized games are a commonplace source of amusement. There are numerous types of computerized games in the marketplace. These games may involve random elements, such as the roll of dice, or skill elements, such as mental choices or physical movements. Many game players are desirous of a game that includes both random elements and skill elements. As such, the subject application provides a game that satisfies both these desires.

BRIEF SUMMARY

The subject application discloses a method of playing a game having a plurality of rounds. The method includes the step of providing a matrix having a plurality of cells formed by plurality of rows and a plurality of columns. A plurality of tokens is generated in response to a user requesting a new round with each token defining a first indicator and a second indicator. The method also includes allowing placement by the user of each of the tokens into one of the cells of the matrix that is available to receive one of the tokens. The method further includes the step of temporarily locking each token to the cell in the matrix in which it is placed in response to the user requesting the new round such that the tokens may not be moved by the user. An award is awarded based on the positional relationship between the indicators of the tokens with respect to one another in response to the user requesting the new round. The method may also include the step of removing at least one token from the matrix based on the positional relationship between the indicators of the tokens with respect to one another in response to the user requesting the new round.

The method of playing the game provides an easy to learn but compelling challenge that many individuals enjoy. In addition to finding combination of tokens that immediately be rewarded, the player must setup the tokens for potential future token generation. Furthermore, the layout of the matrix is compact, such that the method can be practice on a portable device, such as a smartphone.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 1 is a block diagram of a computerized system for playing a game;

FIG. 2 is a view of a display showing play of a first embodiment of the game prior to initiation of a first round of the game including a matrix of cells;

FIGS. 6A and 6B show a chart detailing various token combinations along with point awards and whether the combination will clear the tokens from the matrix in accordance with the first embodiment.

DETAILED DESCRIPTION

Figure 3:
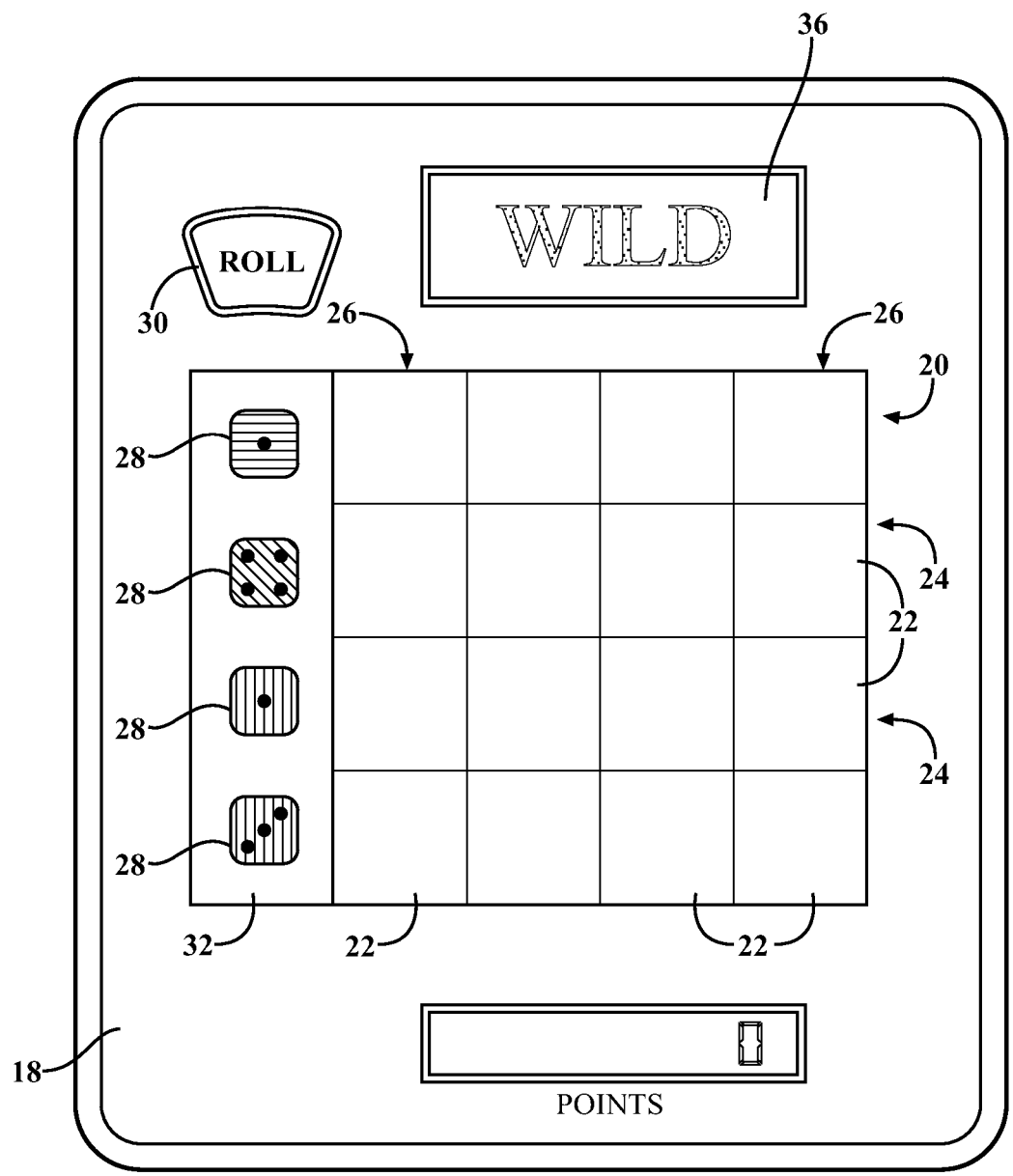
FIG. 3 is a view of the display showing play of the first embodiment of the game after a plurality of tokens are randomly generated in the first round.

Referring to the Figures, wherein like numerals indicate like parts throughout the several views, a method of playing a game and a computerized system 10 for playing the game is shown herein.

The computerized system 10 may be a general purpose personal computer, a smart phone, a personal digital assistant, or other such device. Furthermore, the system 10 may include a plurality of such devices. The computerized system 10 includes at least one processor 12 for executing a software program. The processor 12 may be a microprocessor, microcontroller, application specific integrated circuit, or any other logic circuit capable of performing mathematical operations to execute a software program as is well appreciated by those skilled in the art.

The computerized system 10 includes at least one input device 14 and at least one output device 16 in communication with the processor 12. The input device 14 may be any of the devices known to those skilled in the art for receiving input and/or data from a user. The input device 14 implementation may include, but is certainly not limited to, a keyboard, a mouse, a touch pad, a touch screen interface, a track ball, a joystick, and a button. Those skilled in the art will realize many other suitable input devices 14. The output device 16 is preferably a display screen 18 as is shown in the various figures. However, those skilled in the art realize that the output device 16 could also be a speaker or other item for delivering data and/or information from the processor 12 to the user.

Figure 4:
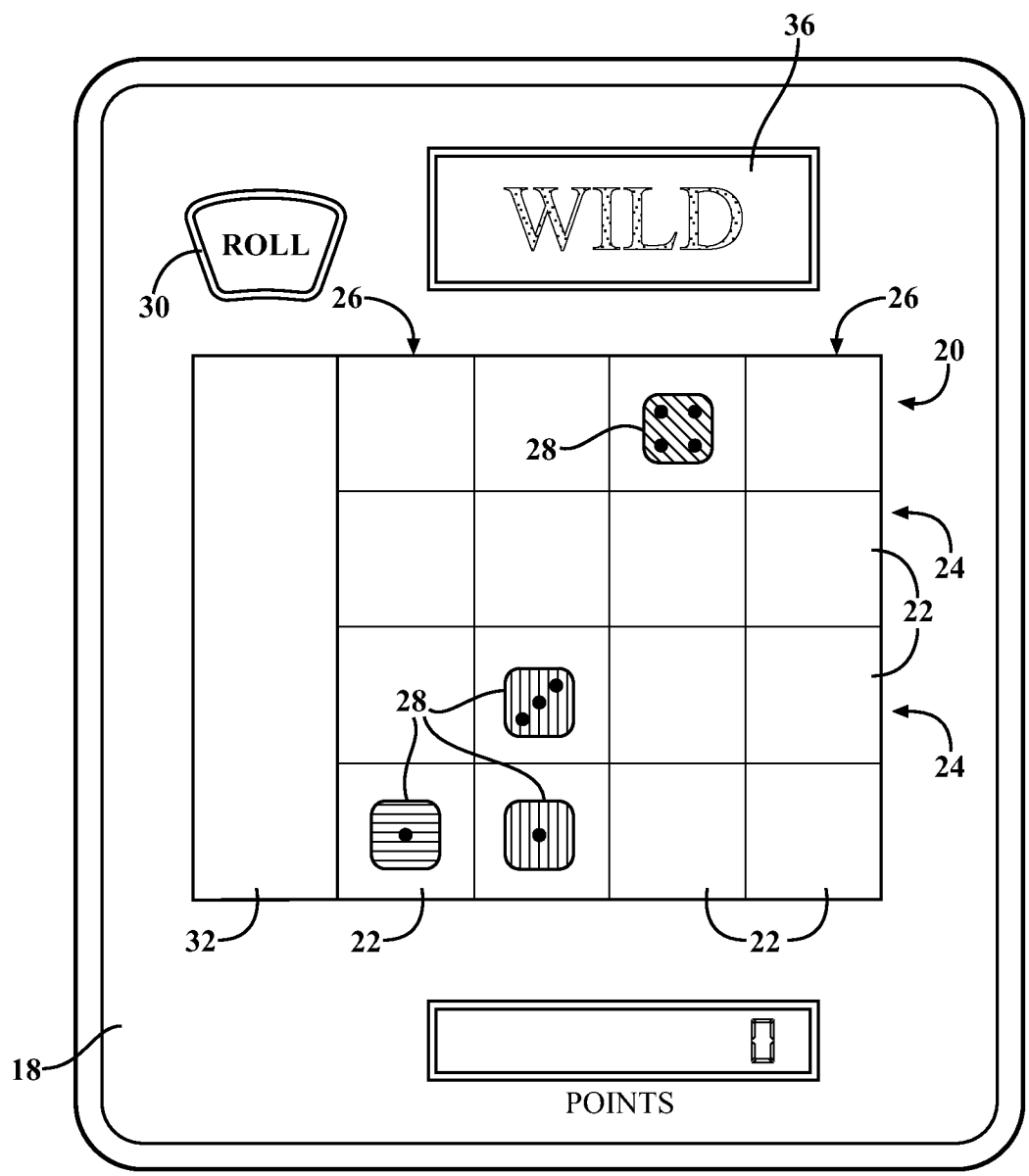
FIG. 4 is a view of the display showing play of the first embodiment of the game including placement of the plurality of tokens in the cells of the matrix.
Figure 5:
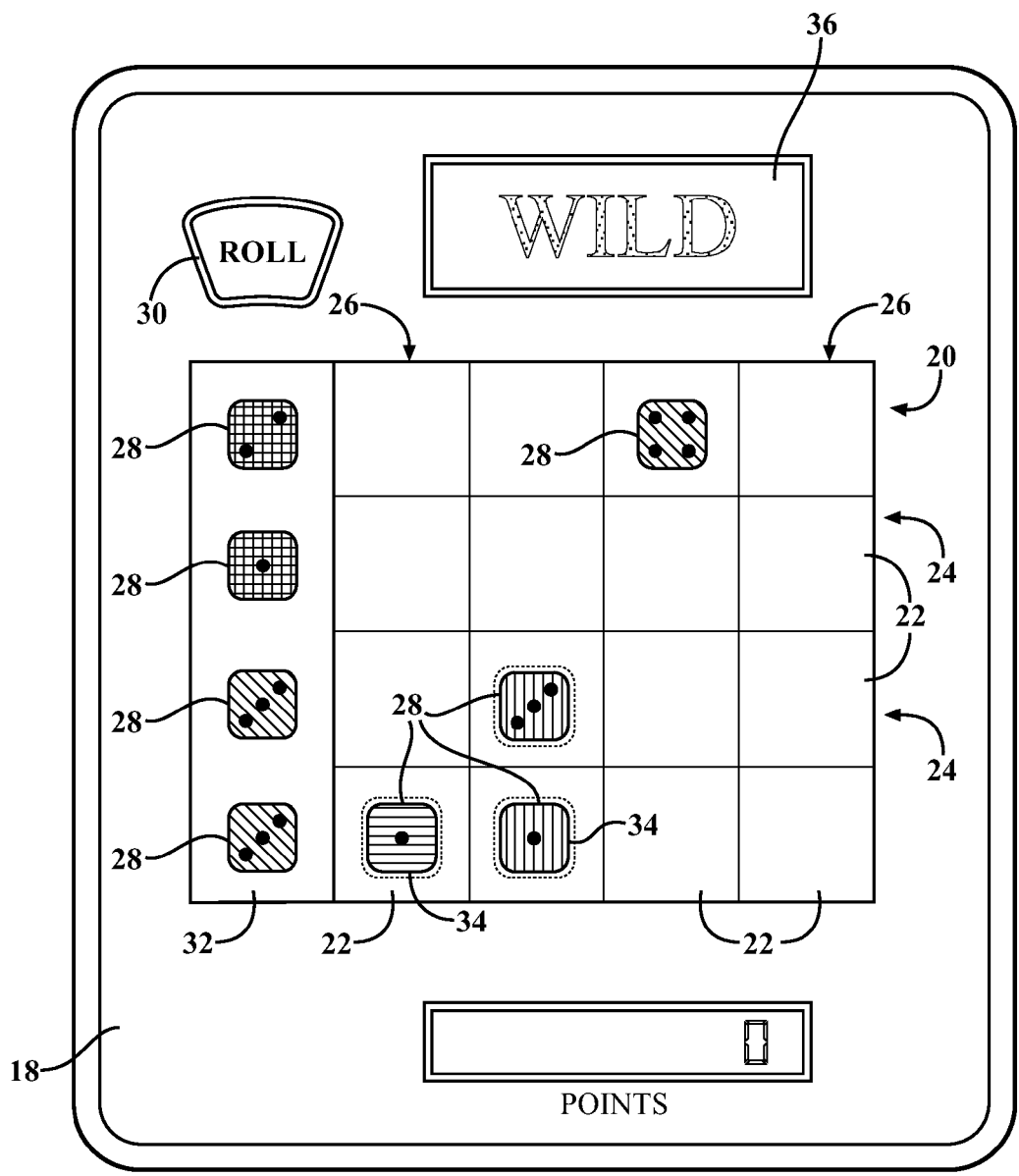
FIG. 5 is a view of the display showing play of the first embodiment of the game after initiation of a second round of the game including the tokens on the matrix being temporarily locked in place.
Figure 7:
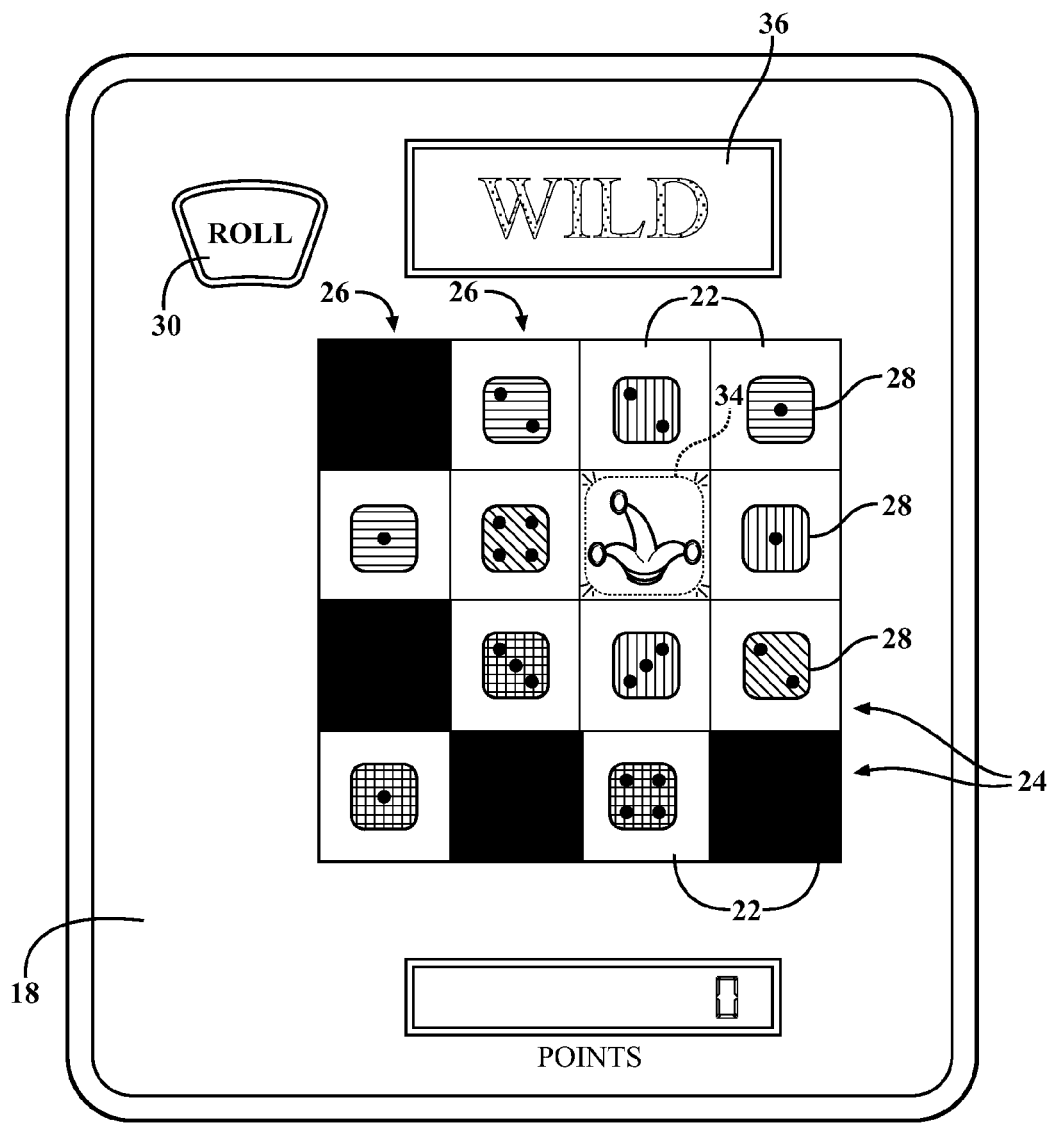
FIG. 7 is a view of the display showing play of a second embodiment of the game after initiation of a first round of the game where the tokens are randomly generated and automatically placed on the matrix.

Referring to FIG. 2, the game is played on a matrix 20 having a plurality of cells 22 formed by a plurality of rows 24 and a plurality of columns 26. The matrix 20, which may also be referred to as a grid or a table, is displayed on the display screen 18 such that the user, or player of the game, may see and interact with the matrix 20. In a first embodiment, as shown in FIGS. 2-4, the number of cells in each row is equal to the number of cells in each column. More specifically, in the first embodiment, the matrix 20 includes four rows and four columns to form a sixteen cell, 4×4 grid. However, in other embodiments, the matrix 20 may be other sizes, including, but not limited to, 3×3, 5×5, 6×6, 3×4, and 5×3. Each of the previous configurations is rectangular. However, the matrix 20 may also be presented in other configurations where each row or column may not present all of the potential cells, thus forming an irregular pattern. That is, some of the cells are blocked and will not accept a token. Such a configuration is shown, for example, in a second embodiment as shown in FIG. 7.

The game is played in a series of rounds. The rounds are initiated by the start of the game or by selection (input) of the user. In the illustrated embodiments, a roll button 30 is selected, or "pressed" by the user. At the initiation of each round, a plurality of tokens 28 is generated. Generation of the tokens is accomplished by the processor 12 using a random number generating algorithm as is readily appreciated by those skilled in the art. That is, for each token, a first indicator and a second indicator is randomly generated from the set of possible indicators. In the first embodiment, the generated tokens 28 are displayed in a holding area 32, as shown in FIG. 3. The tokens 28 each define a first indicator (not numbered) and a second indicator (not numbered). In the illustrated embodiments, each token 28 is presented as one face (not numbered) of a die (not numbered) having a color and displaying dots representing a number. That is, in the illustrated embodiments, the first indicator is a number and the second indicator is a color. However, the first and second indicators, or indicia, may be letters, pictures, lines, symbols, shapes, playing card suits, or other characters as readily appreciated by those skilled in the art.

In the first embodiment, the number of unique first indicators and second indicators is equal to the number of rows 24 and columns 26. Specifically, in the first embodiment, the first indicators comprise four unique marks and the second indicators comprise four unique marks. More specifically, the first indicators are the numbers 1 though 4 and the second indicators are the colors red, green, blue, and yellow. However, the number of first indicators need not be equal to the number of second indicators. Moreover, the number of indicators need not be equal to the number of rows and columns.

The number of tokens generated during each round is preferably equal to the number of rows and the number of columns in the matrix. That is, in the illustrated embodiments, four tokens generated during each round. Of course, those skilled in the art will realize that the number of tokens that are generated may alternatively be any number in order to increase or decrease the difficulty of the game or for other purposes.

After generation of the tokens 28, the first embodiment of the game progresses by allowing placement of the token 28 into cells 22 of the matrix 20 by the user. Placement of the tokens 28 is accomplished using the input device 14. For example, the token 28 may be dragged and dropped using a mouse or a touch screen interface. Those skilled in the art realize other techniques of placing the tokens 28 into the matrix 20. The tokens 28 may only be placed in cells 22 of the matrix 20 that are available to receive a token 28, i.e., the tokens 28 may only be placed in those cells 22 that are already occupied by tokens 28 or where token 28 placement is otherwise prohibited.

Once all of the tokens 28 are placed into the cells 22 of the matrix 20 by the user, the user may then request a new round of the game, i.e., the user may then request the next round of the game to commence. Upon this request, and prior to the next round of the game commencing, the positional relationships between the various indicators of the tokens 28 are evaluated and the tokens 28 are locked in place on the matrix 20, as described in greater detail below.

In the first embodiment, in response to the user requesting a new round, the tokens 28 are temporarily locked into their respective positions in the matrix 20. That is, when the tokens 28 are temporarily locked, the user is not permitted to move the tokens 28 to other cells in the matrix 20 at any time in the game. However, the tokens 28 may be removed from the matrix 20 based on the positional relationship between the indicators of the tokens 28, as described in detail below. In the second embodiment, in response to the user requesting a new round, the tokens 28 are also temporarily locked into their respective positions in the matrix 20. Again, the tokens 28 may be removed from the matrix 20 based on the positional relationship between the indicators of the tokens 28. However, after an additional round of the game, in which the tokens 28 are not removed based on their positional relationship, the tokens 28 are permanently locked. That is, when the tokens 28 are permanently locked, they are not movable by the user nor or they removable based on positional relationship.

As stated to above, in response to the user requesting a new round, the positional relationship between the indicators of the tokens 28 is evaluated. Awards are awarded based on these positional relationships and tokens 28 may be removed from the matrix 20 based on these positional relationships. The award may be points, as described below, or alternatively a payout of a wager.

In the first embodiment, several positional relationships between the indicators of the tokens 28 are evaluated. These positional relationships may be referred to as "scoring areas". In the first embodiment, which utilizes the 4×4 grid matrix, the positional relationships are evaluated between sets of four tokens. These sets include each row of the matrix, each column of the matrix, the diagonals defined between the corners of the matrix, each of four cells forming a square in the matrix, and the four corners of the matrix. In the first embodiment, the 4×4 grid provides a total of twenty different scoring area sets.

Points are awarded based on the indicators of the tokens 28 in the groups, i.e., in the scoring areas. One example would award points when:

the tokens 28 display only one of the first indicators and only one of the second indicators;

the tokens 28 display each of the first indicators and each of the second indicators;

the tokens 28 display each of the first indicators and only one of the second indicators;

the tokens 28 display only one of the first indicators and each of the second indicators;

half of the tokens 28 display one of the first indicators and one of the second indicators and the other half of two tokens display another of the first indicators and another of the second indicators;

the tokens 28 display only one of the second indicators;

the tokens 28 display only one of the first indicators;

half of the tokens 28 display one of the first indicators and one of the second indicators and another half of the tokens display another of the first indicators and another of the second indicators;

the tokens 28 display each of the second indicators and half of the tokens display one of the first indicators;

the tokens 28 display each of the first indicators;

half of the tokens 28 display one of the first indicators;

half of the tokens 28 display one of the second indicators; and half of the tokens 28 display one of the first indicators and the other half of the tokens display another of the first indicators.

The above example, as it is utilized in the first embodiment, is provided in more detail in FIGS. 6A and 6B. However, other examples of scheme to award points are possible and will be readily appreciated by those skilled in the art in order to change the difficulty of the game or for other purposes.

Removal of tokens 28 from the matrix 20 is based on the indicators of the tokens 28 in the groups, i.e., in the scoring areas. FIGS. 6A and 6B provide one example of a scheme to remove tokens 28. Specifically, tokens 28 are removed from the matrix 20 when:

the tokens 28 display only one of the first indicators and only one of the second indicators;

the tokens 28 display each of the first indicators and each of the second indicators; and the tokens 28 display each of the first indicators and only one of the second indicators;

However, other examples of schemes to remove tokens 28 are possible and will be readily appreciated by those skilled in the art in order to change the difficulty of the game or for other purposes.

A wild token 34 may be issued during the course of the game. The wild token 34 may represent any of the first indicators and/or the second indicators during the evaluation of the indicators of the tokens 28. The wild token 34 may be placed in a wild token holding area 36, as seen in FIGS. 2-5 and 7. The wild token 34 may be placed, by the user, in one of the cells 22 in the matrix 20 during any round of the game. Said another way, the wild token 34 may be used at any time after issuance, but need not be used until desired by the user. In the first embodiment, the wild token 34 may be placed in any of the cells 22 of the 4×4 matrix 20, including those cells 22 that are currently occupied by tokens 28, whether locked or unlocked. In the second embodiment, the wild token 34 may be placed in the cells 22 of the 4×4 matrix 20 that are available to accept the token 28, including those cells 22 that have tokens 28 that are temporarily locked or permanently locked.

The game ends when all of the available cells 22 of the matrix 20 are filled, the placement of the tokens 28 will not result in removal of tokens 28 from the matrix 20, and no wild tokens 34 are available for placement. After the game is over, an additional award may be presented to the user depending on the number of points accumulated.

In the second embodiment, the matrix 20 is a sixteen cell, 4×4 grid, but as described above, some of the cells 22 are blocked and will not accept a token 28. Specifically, four cells 22 are blocked in such a manner as to present a 3×3 grid with available cells 22 extending from a center row, a center column, and a diagonal. Additionally, a wild token 34 is permanently locked in a center position of the 3×3 grid. As such, the wild token 34 must be used in each positional relationship.

Upon the initiation of the first round in the second embodiment, a plurality of tokens 28 are randomly generated and placed in each available cell of the matrix 20. That is, no holding area is utilized. The user may the rearrange the tokens 28 on the matrix 20. Once the user is finished arranging the tokens 28, the user then requests the next round. At this time, the positional relationships of the tokens 28 are evaluated between sets of three tokens 28. Tokens 28 may be removed from the matrix 20 based on the positional relationship between the indicators of the tokens 28. Tokens 28 that are not removed may be permanently locked in place, i.e., the tokens 28 cannot be removed from the matrix 20 unless an additional wild token 34 is placed on one of the permanently locked tokens 28. If no tokens 28 are removed from the matrix after the evaluation, then the game ends.

The game described herein may be played with time limits or without time limits. For example, the time between rounds of the game may be regulated. That is, the user may have to move the tokens 28 to the matrix 20 and request the roll button 30 depressed within a certain predetermined time. Furthermore, this predetermined time may vary based on the round. For example, as the rounds of the game progress, the predetermined time may get shorter.

Although the game described herein has been illustrated as being played with the computerized system 10, it is to be appreciated that the game may alternatively be played without the computerized system 10. That is, the game may be played with the tokens 28 implemented as dice, tiles, or other suitable implements for producing random or near random values.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of playing a game having a plurality of rounds, said method being implemented on at least one computing device having non-transitory computer-readable storage medium with an executable program stored thereon, said method comprising the steps of:

executing the program stored on the computer-readable storage medium, wherein the program instructs the at least one computing device to:

provide a matrix having a plurality of cells formed by plurality of rows and a plurality of columns;

generate a plurality of tokens each time a user requests a round with each token defining a first indicator and a second indicator;

allow placement by the user of each of the tokens into one of the cells of the matrix that is available to receive one of the tokens;

temporarily lock each token to the cell in the matrix in which it is placed in response to the user requesting a new round such that the tokens may not be moved by the user; and award an award based on the positional relationship between the indicators of the tokens with respect to one another in response to the user requesting the new round.

2. The method as set forth in claim 1 further comprising the step of removing at least one token from the matrix based on the positional relationship between the indicators of the tokens with respect to one another in response to the user requesting the new round.

3. The method as set forth in claim 1 wherein the number of cells in each row is equal to the number of cells in each column.

4. The method as set forth in claim 1 wherein the matrix includes sixteen cells formed by four rows and four columns.

5. The method as set forth in claim 4 wherein the first indicator comprises four unique marks and the second indicator comprises four unique marks.

6. The method as set forth in claim 4 wherein the first indicator comprises four different numbers and the second indicator comprises four different colors.

7. The method as set forth in claim 1 wherein the positional relationship includes the cells in each row, the cells in each column, the cells in the corners of the matrix, and the cells forming diagonals between the corners.

8. The method as set forth in claim 1 wherein the plurality of tokens generated in each round is equal to the number of cells in each column.

9. The A method as set forth in claim 1 further comprising the step of issuing a wild token that may be placed on any cell of the matrix by the user wherein the wild token may represent any of the first indicators and/or any of the second indicators.

10. The method as set forth in claim 9 wherein said step of awarding an award comprises issuing points based on the positional relationship between the indicators of the tokens with respect to one another.

11. The method as set forth in claim 10 wherein said step of issuing a wild token is done in response to a number of points exceeding a predetermined number of points.

12. computerized system for playing a game, said system comprising:
   a processor for executing a software program;
   a display in communication with said processor; and
   an input device in communication with said processor; wherein
   said processor providing a matrix having a plurality of cells formed by plurality of rows and a plurality of columns, wherein said matrix is displayed on said display;
   said processor generating a plurality of tokens each time a user requests a round via said input device with each token defining a first indicator and a second indicator;
   said input device receiving data regarding placement of each of the tokens into one of the cells of the matrix that is available to receive one of the tokens;
   said processor locking a position of each token in the matrix in response to the user requesting a new round; and
   said processor awarding an award based on the positional relationship between the indicators of the tokens with respect to one another in response to the user requesting the new round.

13. A method of playing a game having a plurality of rounds, said method being implemented on at least one computing device having non-transitory computer-readable storage medium with an executable program stored thereon, said method comprising the steps of:
   executing the program stored on the computer-readable storage medium, wherein the program instructs the at least one computing device to:
   provide a matrix having a plurality of cells formed by plurality of rows and a plurality of columns;
   generate a plurality of tokens each time a user requests a round with each token defining a first indicator and a second indicator;
   allow placement by the user of each of the tokens into one of the cells of the matrix that is available to receive one of the tokens;
   award an award based on the positional relationship between the indicators of the tokens with respect to one another in response to the user requesting a new round; and
   remove at least one token from the matrix based on the positional relationship between the indicators of the tokens with respect to one another in response to the user requesting the new round.

14. The method as set forth in claim 13 further comprising the step of temporarily locking each token to the cell in the matrix in which it is placed in response to the user requesting the new round such that the tokens may not be moved by the user.

* * * * *

UNITED STATES PATENT AND TRADEMARK OFFICE
CERTIFICATE OF CORRECTION

PATENT NO. : 8,419,517 B2
APPLICATION NO. : 12/945300
DATED : April 16, 2013
INVENTOR(S) : James Prucey Page 1 of 1

It is certified that error appears in the above-identified patent and that said Letters Patent is hereby corrected as shown below:

In the Claims:

In Column 7, Line 11, please insert --A-- before "computerized system".

Signed and Sealed this
Second Day of July, 2013

Teresa Stanek Rea
*Acting Director of the United States Patent and Trademark Office*